United States Patent
Negishi et al.

(10) Patent No.: US 7,832,650 B2
(45) Date of Patent: Nov. 16, 2010

(54) HOT WATER-WATER MIXING FAUCET

(75) Inventors: Isao Negishi, Kiyose (JP); Yoshinori Nishino, Kiyose (JP); Eiji Seki, Kiyose (JP)

(73) Assignee: Nippon Thermostat Co., Ltd., Kyose-shi (JP)

( * ) Notice: Subject to any disclaimer, the term of this patent is extended or adjusted under 35 U.S.C. 154(b) by 785 days.

(21) Appl. No.: 11/630,260

(22) PCT Filed: Jan. 23, 2006

(86) PCT No.: PCT/JP2006/000960
§ 371 (c)(1),
(2), (4) Date: Dec. 21, 2006

(87) PCT Pub. No.: WO2006/117903
PCT Pub. Date: Nov. 9, 2006

(65) Prior Publication Data
US 2008/0035209 A1 Feb. 14, 2008

(30) Foreign Application Priority Data
Apr. 28, 2005 (JP) ............................. 2005-131307

(51) Int. Cl.
*G05D 23/185* (2006.01)
*G05D 23/13* (2006.01)
(52) U.S. Cl. .................... 236/12.11; 236/12.17
(58) Field of Classification Search ........... 236/12.11, 236/12.17, 12.16, 12.1–12.9, 12.2–12.23; 137/60, 88, 1–3
See application file for complete search history.

(56) References Cited

U.S. PATENT DOCUMENTS

| 2,267,976 | A | * | 12/1941 | Hermann | ............... | 236/12.18 |
| 3,112,879 | A | * | 12/1963 | Killias | ............... | 236/12.15 |
| 3,896,836 | A | * | 7/1975 | Labarre | ............... | 236/12.22 |
| 4,029,256 | A |   | 6/1977 | Dauga | | |
| 5,806,761 | A | * | 9/1998 | Enoki et al. | ............... | 236/12.2 |
| 6,604,687 | B2 | * | 8/2003 | Goncze et al. | ............... | 236/12.2 |

FOREIGN PATENT DOCUMENTS

| JP | 2-2578 U | 1/1990 |
| JP | 4-71882 U | 6/1992 |
| JP | 9-152050 A | 6/1997 |
| JP | 11-257528 A | 9/1999 |
| JP | 2001-263511 A | 9/2001 |
| JP | 2002-98243 A | 4/2002 |

* cited by examiner

*Primary Examiner*—Frantz F Jules
*Assistant Examiner*—Emmanuel Duke
(74) *Attorney, Agent, or Firm*—Smith Patent Office

(57) ABSTRACT

A hot water-water mixing faucet holds a control valve body in a balanced position between a bias spring and a temperature-sensitive coil spring. An adjusting screw 6a supports the bias spring in an axial direction to change setting of the supporting position of the bias spring, and a rear end side of the bias spring is supported by a supporting member which is formed separately from the adjusting screw. The supporting member is slidably inserted in the axial direction into a through-hole provided on the adjusting screw and is connected detachably to the adjusting screw by an abutting section provided in an area protruding from the through-hole toward the bias spring side. A lifting spring biases the supporting member to pull the supporting member back toward the side opposite to the bias spring to the adjusting screw 6a.

2 Claims, 6 Drawing Sheets

HOT WATER-WATER MIXING FAUCET

BACKGROUND OF THE INVENTION

1. Field of the Invention

The present invention relates to a hot water-water mixing faucet and ejecting the mixture. Particularly, the present invention relates to the improvement of a valve for mixing cold and hot water having an embodiment in which a hot-water inlet and a cold-water inlet are provided parallel in an axial direction on a peripheral wall of a cylindrical casing which is formed cylindrically and incorporated in the form of a cartridge into a cylindrically formed casing which is an external housing of the hot water-water mixing faucet. A hot-water valve seat and a cold-water valve seat are provided in the axial direction in inner surfaces of the hot-water inlet and the cold-water inlet respectively such that they face each other. A cylinder control valve body, which comprises, at both axial ends thereof, a hot-water valve and a cold-water valve which face the hot-water valve seat and the cold-water valve seat respectively, is disposed in the casing so as to be able to move in the axial direction. A leading end of a temperature-sensitive coil spring, which supports a rear end thereof using the casing, and a leading end of a bias spring, which supports a rear end thereof using an adjusting screw, are caused to face each other and coupled with each other in the control valve body, which is supported by the balance between the pair of springs so as to be able to move in the axial direction. When the hot water and the cold water, which flow in from the hot-water inlet and the cold-water inlet respectively, are mixed and the mixture is ejected, the temperature-sensitive coil spring is caused to sense the temperature of the mixture, and a change of the spring constant of the temperature-sensitive coil spring in accordance with the change of the temperature causes the control valve body to perform control operation, whereby the temperature of the ejected mixture is kept at a set temperature.

2. Discussion of the Related Art

The hot water-water mixing faucet is configured as shown in FIG. 1 and FIG. 2, such that the control valve provided so as to be able to move in the axial direction is held in a state in which the temperature-sensitive coil spring and the bias spring are balanced, and that the operation of the control valve is controlled automatically by the temperature-sensing operation of the temperature-sensitive coil spring so that the temperature of the ejected mixture is kept at the set temperature.

In FIG. 1, a dashed line 1 is a cylindrically formed external housing (case), which is an external box of a hot water-water mixing faucet A which is constructed and installed for the purpose of supplying hot water/cold water to a bathroom or the like, wherein a cylinder wall thereof is provided with a hot-water inlet pipe 10 connected to a hot-water faucet, a cold-water inlet pipe 11 connected to a cold-water faucet, and an ejection pipe 12 for ejecting a mixture.

2 is a casing, which is fitted into the external housing 1 and assembles a control valve mechanism w to be incorporated in the form of a cartridge. The casing is formed into a cylinder so as to be inserted into the external housing 1 by means of a closed-end cylindrical main body 2a and a valve seat clamp 2b screwed into the cylindrical main body 2a, and a hot-water inlet 20 and a cold-water inlet 21 are formed axially (longitudinal direction in FIG. 1) with a space therebetween on a peripheral wall of the casing. Furthermore, a hot-water valve seat a and a cold-water valve seat b are formed on an inner position of each of the hot-water inlet 20 and cold-water inlet 21 so as to face each other as a pair.

3 is a control valve body, which is disposed between the space formed by the hot-water valve seat a and the cold-water valve seat b facing each other, so as to be able to move axially in the space, the control valve body being formed into a cylindrical valve, wherein a hot-water valve 3a is provided on the side facing the hot-water valve seat a, and a cold-water valve 3b is formed on an edge on the side facing the cold-water valve seat b.

4 is a bias spring, which biases the control valve body 3 such as to push the control valve body 3 out toward the cold-water valve seat b, and 5 is a temperature-sensitive coil spring, which biases the control valve body 3 such as to push the control valve body 3 out toward the hot-water valve seat a.

As the temperature-sensitive coil spring 5, a shape memory alloy ("SMA" for short) is used. The load on the temperature-sensitive coil spring is changed by the temperature because the elastic force is reduced by cooling the temperature-sensitive coil spring and increased by heating the temperature-sensitive coil spring, and the temperature-sensitive coil spring is stretched by the temperature since it is formed into a spring. Therefore, the stretching force is used as the load to operate the control valve body and control the control operation thereof, thus the temperature-sensitive coil spring is used in a temperature actuator.

6a is an adjusting screw, which supports a rear end side of the bias spring 4 and is incorporated so as to engage an outer peripheral surface thereof with an internal surface of the casing 2 so that the adjusting screw is regulated in a peripheral direction and moves in the axial direction, wherein a female screw is formed on an inner peripheral surface.

6b is an adjusting screw axis, which is provided in the casing 2 so as to be turned by a temperature-regulating dial D1 provided on one end of the casing 2, wherein a male screw is provided on an outer peripheral surface so that the adjusting screw axis is screwed to the adjusting screw 6a by the mail screw.

In the hot water-water mixing faucet A with such an embodiment, the adjusting screw 6a is displaced toward the axial direction by a turning operation of the temperature-regulating dial D1, a supporting position on other end of the bias spring 4 is set to a desired position, in which state the control valve body 3 is held in a position balanced by the bias spring 4 and the temperature-sensitive coil spring 5, the temperature-sensitive coil spring 5 performs a sensing operation in accordance with the change in the temperature of the mixture, and displaces the control valve body 3 using a biasing force of the bias spring when a generated load is changed, and the temperature of the mixture to be ejected is held at a set temperature.

More specifically, in FIG. 2, the control valve body 3 is supported so as to be able to move axially by coupling, at both ends thereof, a leading end of the bias spring 4, which supports a rear end thereof using the adjusting screw 6a, with a leading end of the temperature-sensitive coil spring 5, which supports a rear end thereof using the casing 2, and causing these leading ends to face each other. The control valve body 3 is also held in a position where the bias spring 4 and the temperature-sensitive coil spring 5 are balanced. Hot water, which flows from the hot-water inlet 20 into the casing 2 via a space between the hot-water valve 3a and the hot-water valve seat a, and cold water, which flows from the cold-water inlet 21 into the casing 2 via a space between the clod-water valve 3b and the cold-water valve seat b, merge and are mixed in a mixing chamber 22 formed on other end of the casing 2 to obtain a mixture. When the mixture is ejected from a mixture outlet 23, the temperature-sensitive coil spring 5, which is disposed in the mixing chamber 22, senses the temperature of the mixture and thereby changes a generated load, whereby control is performed so as to displace the control valve body 3 by using the biasing force of the bias spring 4, and further control is performed so as to keep the temperature of the mixture at a set desired temperature.

Specifically, when the flow volume of the flowing cold water decreases and thereby the temperature of the mixture inside the mixing chamber 22 increases, the temperature-sensitive coil spring 5 sensing such occurrence is operated so as to increase the generated load, the bias spring 4 is screwed by the amount of the increased load, the control valve body 3 is moved toward the left, the space between the hot-water valve 3a and the hot-water valve seat a is narrowed, and the flow volume of the hot water is reduced, whereby the increased temperature of the mixture is reduced. Consequently, the control valve body 3 is stabilized at the position where the mixture ratio between the hot-water and cold water in the mixture and the temperature of the mixture are balanced.

Further, in the case in which the flow volume of the flowing cold water increases because of the increase of water pressure, and thereby the temperature of the mixture inside the mixing chamber 22 decreases, the temperature-sensitive coil spring 5 operates to sense such occurrence and thereby reduces the generated load, the bias spring 4 is stretched out by the reduced amount of load, the control valve body 3 is moved toward the right, and the space between the cold-water valve 3b and the cold-water valve seat b is narrowed to reduce the flow volume of the flowing cold water and thus the amount of the cold water, whereby the reduced temperature of the mixture is increased. Consequently, the control valve body 3 is stabilized at the position where the mixture ratio between the flowing hot water and cold water and the temperature of the mixture are balanced.

In the hot water-water mixing faucet A having such an embodiment in which the temperature-sensitive coil spring 5 constituted by the SMA spring is used, the temperature-sensitive coil spring 5 being operated as described above, when ejecting the cold water, the adjusting screw 6a of a supporting member g supporting the other end of the bias spring 4 is moved toward the left by operating and turning the temperature-regulating dial D1, the control valve body 3 is displaced toward the hot-water valve seat a side, the space between the hot-water valve 3a and the hot-water valve seat a is completely closed, and the space between the cold-water valve seat b and the cold-water valve 3b is opened widely. At this moment, however, the temperature-sensitive coil spring 5 constituted by the SMA spring does not have sufficient power to press the control valve body 3 toward the hot-water valve seat a because the generated load is reduced by the reduction of the temperature, thus it is inevitable that the space between the hot-water valve seat a and the hot-water valve 3a cannot be closed completely.

In order to cope with such a circumstance, it is required that the temperature-sensitive coil spring 5 have a large spring load. Consequently, if a temperature-sensitive coil spring with a large generated load is used, there arises a problem that the size of the hot water-water mixing faucet A to be assembled increases.

Furthermore, when the temperature-regulating dial D1 is turned to move the control valve body 3, and the space between the cold-water valve seat b and the cold-water valve 3b is completely closed while the space between the hot-water valve seat a and the hot-water valve 3a is opened in order to eject the hot water, or when the space between the hot-water valve seat a and the hot-water valve 3a is completely closed while the space between the cold-water valve seat b and the cold-water valve 3b is opened in order to eject the cold water, there arises a problem that the flow of the cold water or the hot water is shut off suddenly, causing a hunting phenomenon, damaging the apparatus.

Moreover, in the hot water-water mixing faucet A in which the control valve body 3 is connected with the temperature-sensitive coil spring 5 and the bias spring 4 such that the temperature-sensitive coil spring 5 and the bias spring 4 are allowed to face each other, whereby the control valve body 3 is supported by the balance between these two springs so as to be able to move in the axial direction, since the balance between the two opposing springs causes the control valve body 3 to perform a control operation, the operation of the control valve body 3 becomes uncoordinated if the area of contact in each of the connected positions between the control valve body 3 and the two springs is changed. Therefore, in order to facilitate the operation smoothly, it is required to flatten the end surface, which is the point of connection between the control valve body 3 and each of the two springs, so that the spring pressure correctly acts on the control valve body 3 even if bending occurs on the springs, thus there arises a problem that the cost of manufacturing the springs increases.

A problem to be solved by the present invention is, first of all, a development of the means of completely closing the space between the hot-water valve 3a and the hot-water valve seat a when ejecting the cold water, without increasing the size of the temperature-sensitive coil spring 5 constituted by the SMA spring. The second problem is a development of the means of effectively avoiding the hunting phenomenon which occurs when the space between the cold-water valve seat b and the cold-water valve 3b or the space between the hot-water valve seat a and the hot-water valve 3a is closed suddenly. The third problem is a development of the means of using the two springs, i.e. the temperature-sensitive coil spring 5 and the bias spring 4, in a manner that they face each other, so that, without performing processing of polishing the end surfaces of the springs to obtain flat surfaces, the control valve body 3 smoothly operates when the balance between the springs causes the control valve body 3 to carry out its control operation.

SUMMARY OF THE INVENTION

As the means to solve the above-described problems, the present invention is a hot water-water mixing faucet, in which a hot-water inlet 20 and a cold-water inlet 21 are arranged in an axial direction on a peripheral wall of a cylindrical casing 2; circular hot-water valve seat a and cold-water valve seat b are provided face to face on inner positions of the hot-water inlet 20 and the cold-water inlet 21 respectively; a cylindrical control valve body 3, which forms a hot-water valve 3a and a cold-water valve 3b into a circle at both edges of the control valve body 3, is embedded in the cylindrical casing 2 so as to be able to move in the axial direction; a leading end of a bias spring 4, whose rear end is supported by an adjusting screw 6a, is connected to a leading end of a temperature-sensitive coil spring 5, whose rear end is supported by the casing 2 such that the both leading ends face each other from both edges of the control valve body 3, so that the control valve body 3 is held at the position at which the two springs of the bias spring 4 and the temperature-sensitive coil spring 5 are balanced; the adjusting screw 6a supporting the bias spring 4 is screwed to an adjusting screw axis 6b which is turned by a turning operation of a temperature-regulating dial D1 assembled to one end of the casing 2; and the adjusting screw 6a is moved in the axial direction by turning the adjusting screw axis 6b so that the supporting position of the bias spring 4 is changed for setup, the hot water-water mixing faucet being characterized in that the rear end of the bias spring 4 is supported by a supporting member g formed separately from the adjusting screw 6a, the supporting member g is inserted into a through-hole 63 provided on the adjusting screw 6a so that the supporting member g slidingly moves in the axial direction, and is connected with the adjusting screw 6a separably by means of an abutting section t1 provided in an area protruding from the through-hole 63 toward the bias spring 4, and a lifting spring 7, which biases the supporting member g to pull the supporting member g back toward the side opposite to the bias spring 4 to the adjusting screw 6a, is provided between an area protruding from the through-hole 63 toward the side opposite to the bias spring 4 and the adjusting screw 6a, the lifting spring 7 being incorporated so as not to cause the lifting spring 7 to act when setting a range of normal temperature but to generate a load for biasing the control valve body 3 toward a side of the hot-water valve seat a only when setting for cold-water ejection is performed.

Moreover, along with the above aspect, the second means presented is a hot water-water mixing faucet, in which a hot-water inlet 20 and a cold-water inlet 21 are arranged in an axial direction on a peripheral wall of a cylindrical casing 2; circular hot-water valve seat a and cold-water valve seat b are provided face to face on inner positions of the hot-water inlet 20 and the cold-water inlet 21 respectively; a cylindrical control valve body 3, which forms a hot-water valve 3a and a cold-water valve 3b into a circle at both edges of the control valve body 3, is embedded in the cylindrical casing 2 so as to be able to move in the axial direction; a leading end of the bias spring 4, whose rear end is supported by an adjusting screw 6a, is connected to a leading end of a temperature-sensitive coil spring 5, whose rear end is supported by the casing 2, such that the both leading ends face each other from both edges of the control valve body 3, so that the control valve body 3 is held at the position at which the two springs of the bias spring 4 and the temperature-sensitive coil spring 5 are balanced; the adjusting screw 6a supporting the bias spring 4 is screwed to an adjusting screw axis 6b which is turned by a turning operation of a temperature-regulating dial D1 assembled to one end of the casing 2; and the adjusting screw 6a is moved in the axial direction by turning the adjusting screw axis 6b so that the supporting position of the bias spring 4 is changed for setup, the hot water-water mixing faucet being characterized in that the valve of either the hot-water valve 3a or the cold-water valve 3b provided in a circular shape in the control valve body 3, and the valve seat of either the hot-water valve seat a or the cold-water valve seat b provided in a circular shape in the casing 2 are installed such that a center line X of the valve of either the hot-water valve 3a or the cold-water valve 3b is slightly decentered to one side of an axis center line Z of the valve seat of either the hot-water valve seat a or the cold-water valve seat b in facing the axis center line Z.

The third means presented is a hot water-water mixing faucet, in which a hot-water inlet 20 and a cold-water inlet 21 are arranged in an axial direction on a peripheral wall of a cylindrical casing 2; circular hot-water valve seat a and cold-water valve seat b are provided face to face on inner positions of the hot-water inlet 20 and the cold-water inlet 21 respectively; a cylindrical control valve body 3, which forms a hot-water valve 3a and a cold-water valve 3b into a circle at both edges of the control valve body 3, is embedded in the cylindrical casing 2 so as to be able to move in the axial direction; a leading end of the bias spring 4, whose rear end is supported by an adjusting screw 6a, is connected to a leading end of a temperature-sensitive coil spring 5, whose rear end is supported by the casing 2, such that the both leading ends face each other from both edges of the control valve body 3, so that the control valve body 3 is held at the position at which the two springs of the bias spring 4 and the temperature-sensitive coil spring 5 are balanced; the adjusting screw 6a supporting the bias spring 4 is screwed to an adjusting screw axis 6b which is turned by a turning operation of a temperature-regulating dial D1 assembled to one end of the casing 2; and the adjusting screw 6a is moved in the axial direction by turning the adjusting screw axis 6b so that the supporting position of the bias spring 4 is changed for setup, the hot water-water mixing faucet being characterized in that, in the casing 2 a guide g2 following an axis center line is provided in an axis center area of the casing 2 to hold the casing 2, in the control valve body 3 of a control valve mechanism w a through-hole 30 following an axis center line is formed in an axis center area of the control valve body 3 and fitted around the guide g2 so as to be able to slide, to restrict an operation of the control valve body 3 in the axial direction, and the shape of each of the end sections of the bias spring 4 and the temperature-sensitive coil spring 5, which are connected to the control valve body 3, remains the same as when the springs are formed.

The first means is a hot water-water mixing faucet A, wherein the balanced position of the control valve body 3, which is supported by the balance between the two springs of the temperature-sensitive coil spring 5 and the bias spring 4 facing each other, is set to a position having a desired set temperature by moving the adjusting screw 6a by means of a turning operation of the temperature-regulating dial D1 to move the supporting member g, and displacing the supporting position of the other end of the bias spring 4 supported by the supporting member g to change the balanced load position between the two springs, and a mixture of predetermined temperature is ejected from the ejection port 23 for the mixture by means of the setting. When the adjusting screw 6a is pushed into the cold-water valve seat b side by means of an operation of the adjusting screw axis 6b by operating and turning the temperature-regulating dial D1 so that ejection of the mixture of a desired temperature is set, and when the supporting member g is further pushed into the cold-water valve seat b side to completely close the cold-water valve seat b so that hot-water ejection is set in which only the hot water is ejected from the ejection port 23, the supporting member g is integrally connected to the adjusting screw 6a by an abutment between the abutting section t1 and the adjusting screw 6a which are provided on the supporting member g. When the supporting member g is pulled back toward the hot-water valve seat a side to completely close the hot-water valve seat a so that cold-water ejection is set in which only the cold-water is ejected from the ejection port 23 for the mixture, the supporting member g freely slides on the inside of the through-hole 63 provided on the adjusting screw 6a and slides in the axial direction toward the adjusting screw 6a.

Then, the lifting spring 7, which is formed into the shape of a coil, is inserted into a protruding end section of the supporting member g which passes through and thus protrudes through the through-hole 63 provided in an opened manner on the adjusting screw 6a, and the spring 7 is compressed between the adjusting screw 6a and a flange t2 or retaining ring provided on the protruding end section of the supporting member g, whereby the supporting member g is pulled out toward the hot-water valve seat a. By incorporating the supporting member g in this manner, the lifting spring 7 does not act when setting a range of normal temperature but is caused to generate a load for biasing the control valve body 3 toward the hot-water valve seat a side only when setting for the cold-water ejection is performed. The generated load is added to a generated load of the temperature-sensitive coil spring 5, the generated load being reduced by temperature reduction caused by the cold-water ejection, and the spring load of the temperature-sensitive coil spring 5 pushes the control valve body 3 toward the hot-water valve seat a side to securely perform an operation of completely closing the space between the hot-water valve seat a and the hot-water valve 3a. The first means has been completely by reaching the above-described idea. Accordingly, the hot-water valve side can be closed completely at the time of cold-water ejection, without increasing the size of the temperature-sensitive coil spring.

In the second means, when the set position of the control valve body 3 is moved by operating the temperature-regulating dial D1 to completely close the hot-water valve seat a side or the cold-water valve seat b side, a possible hunting phenomenon occurs by suddenly closing the flow path for the hot water or cold water. Therefore, for example, when the control valve body 3 falls onto a sheet surface of the cold-water valve seat b of the center of the axis center line, the cold-water valve seat b being formed into a circular shape on an upper end section of a valve seat clamp 2b, and when the cold-water valve 3b, which is formed into a circular shape to a lower end of the control valve body 3 to shut off the flow path, a virtual center line of the cold-water valve 3b which is formed into a circular shape is formed so as to be decentered to one side of the axis center line. By causing a circular sealing surface of the cold-water valve 3b of the control valve body 3 to gradually contact with a part of the sheet surface of the cold-water valve seat b from the decentered side, the whole sheet surface of the cold-water valve seat b is no longer closed completely at once, whereby the hunting phenomenon can be eliminated. The second means is devised and configured in the above-described manner, and after conducting a test, an expected result was obtained. The second means therefore obtained the result in which the hunting phenomenon was eliminated effectively.

Moreover, the third means is a hot water-water mixing faucet A in which the two springs, the temperature-sensitive coil spring 5 and the bias spring 4, are used such that the springs face each other, and the balance between the two springs are used to support the control valve body 3 in a suspended fashion. In this configuration, it is necessary to flatten the end surfaces of the respective used springs which contact with the control valve body 3, because, since the control valve body 3 can move freely by being supported in a suspended fashion in the air by the two opposing springs, the control valve body 3 moves irregularly with respect to the direction of the axis center line when performing a control operation using a temperature-sensing operation of the temperature-sensitive coil spring 5. Therefore, by restricting the irregular movement of the control valve body 3 so that it moves only in the direction of the axis center line, the control valve body 3 can smoothly perform the control operation even if the shape of each of the end surfaces of the respective used springs remains the same as when the springs are formed. The third means is devised in the manner described above, and after conducting a test by configuring the third means such that the movement of the control valve body 3 is restricted by guiding to move only in the direction of the axis center line, and after conducting a testing, a result was obtained. Accordingly, the production cost can be reduced.

The first invention of the present invention is the valve for mixing cold and hot water having the embodiment in which the control valve mechanism w for holding the control valve body 3 by means of the balance between the two springs of the bias spring 4 and the temperature-sensitive coil spring 5 is incorporated in the cylindrical casing 2, and the temperature-regulating means for changing the balanced position between the two springs by operating the temperature-regulating dial D1 is connected to the control valve mechanism w. In the control valve mechanism w, there is incorporated the lifting spring 7 which does not act when setting a range of normal temperature but generates a load for biasing the control valve body 3 toward the hot-water valve seat a side only when setting the cold-water ejection, thus the hot-water valve side can be completely closed at the time of cold-water ejection, without increasing the diameter of the temperature-sensitive coil spring 5.

Furthermore, in the second invention, the valve of the hot-water valve 3a/cold-water valve 3b, which is formed into a circular shape on the control valve body 3, and the valve seat of the hot-water valve seat a/cold-water valve seat b, which is formed into a circular shape on the casing 2, are installed to obtain a positional relation in which the center line X of the valve of the hot-water valve 3a/cold-water valve 3b is decentered to one side of the axis center line Z of the hot-water valve seat a/cold-water valve seat b so as to face the axis center line Z. Therefore, when the space between the valve and the valve seat is completely closed the sheet surface of the valve seat is partially and gradually sealed instead of being sealed entirely at once, whereby the hunting phenomenon can be eliminated effectively.

Moreover, in the third invention, the movement of the control valve body 3 performing the control operation is restricted by the supporting member g to the direction following the axial direction, the control valve body 3 being held in a suspended fashion by the two springs of the bias spring 4 and the temperature-sensitive coil spring 5. Therefore, even if the shape of each of the end surfaces of the bias spring 4 and the temperature-sensitive coil spring 5, which are connected with the control valve body 3, remains the same as when the springs are formed, the irregular movement of the control valve body 3 is prevented, whereby the cost of manufacturing the bias spring 4 and temperature-sensitive coil spring 5 can be reduced.

DETAILED DESCRIPTION OF THE PREFERRED EMBODIMENTS

Embodiments of the present invention are described hereinafter with reference to the drawings respectively.

Embodiment 1

Figure 1:
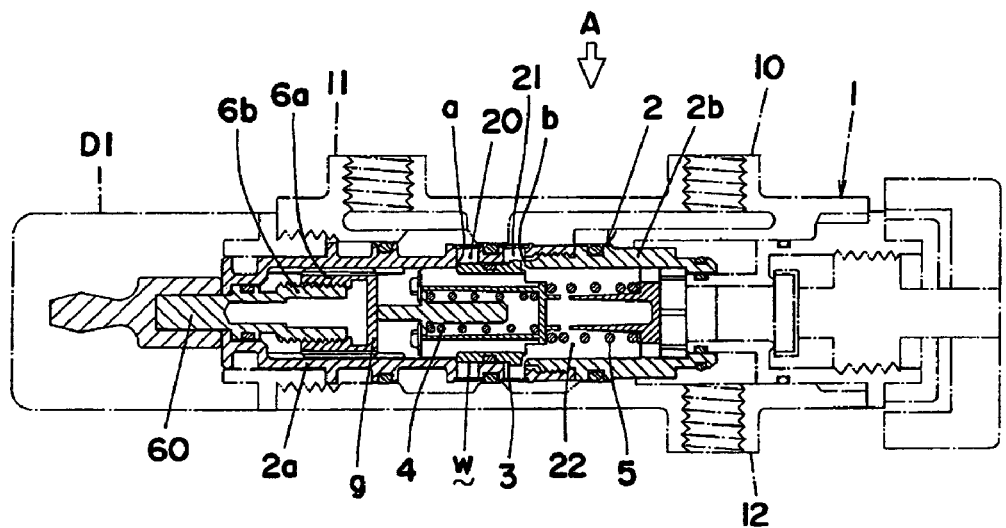
FIG. 1 is a cross-sectional plan view of a hot water-water mixing faucet having an embodiment in which a conventional control valve body is supported by the balance between two springs.
Figure 2:
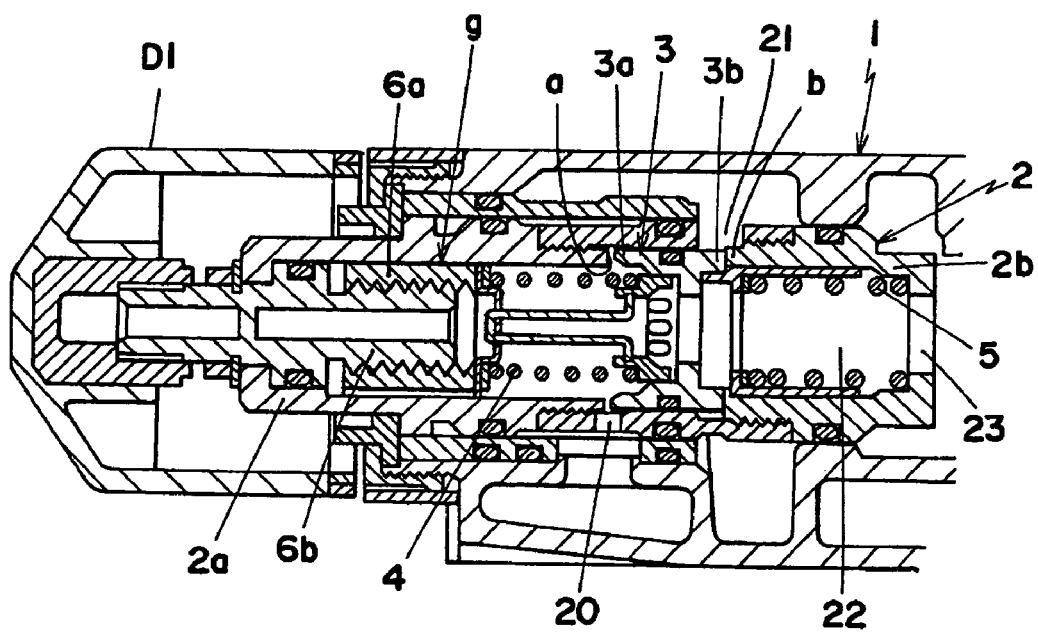
FIG. 2 is a cross-sectional view of a substantial part of the above-described hot water-water mixing faucet.
Figure 3:
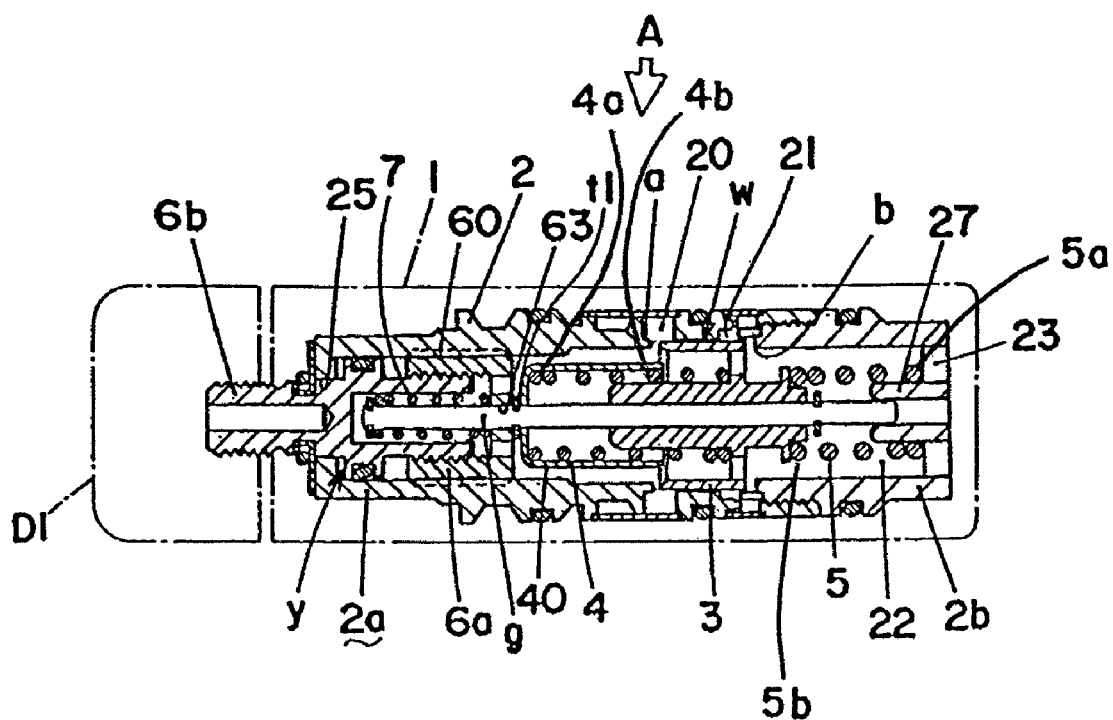
FIG. 3 is a longitudinal section view of an embodiment of a hot water-water mixing faucet which implements the means of the present invention.

FIG. 3 shows a first embodiment of the hot water-water mixing faucet according to the present invention. This embodiment is implemented in an example in which the body of the hot water-water mixing faucet A is configured with the external housing 1, which is an external box shown with a dashed line, and the cylindrical casing 2 inserted detachably into the external housing 1. The control valve mechanism w is assembled to the casing 2 so as to be housed therein, to form the assembly into a cartridge, which is then fitted into the external housing 1 in the form of a cartridge, whereby the hot water-water mixing faucet A is configured. This embodiment explains the casing 2, which is inserted into the external housing 1 in the form of a cartridge, and the control valve mechanism w.

Figure 4:
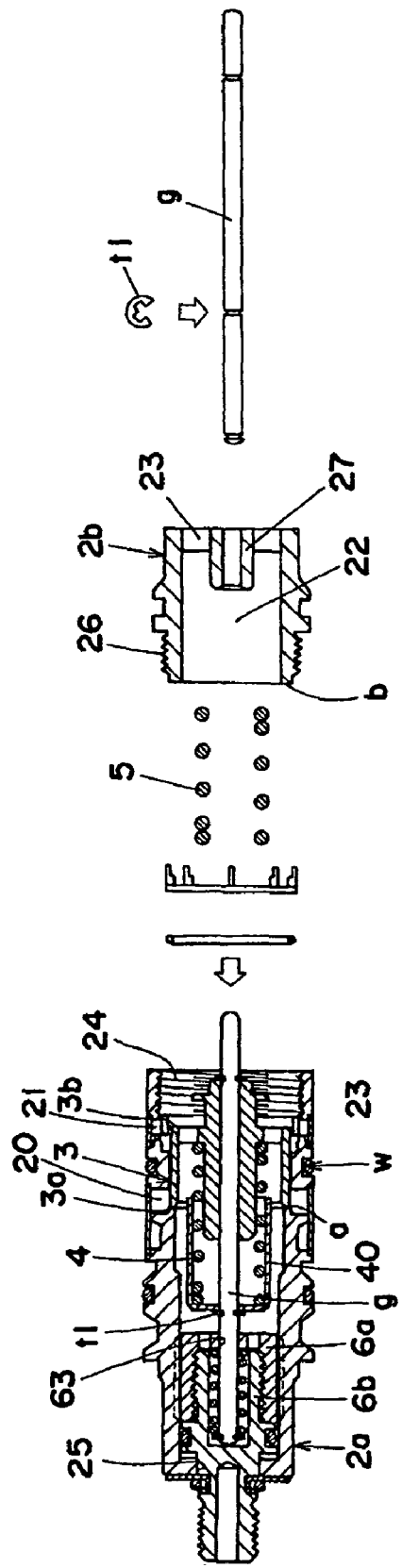
FIG. 4 is an explanatory diagram of an assembling process of the above-described embodiment.

As shown in FIG. 4, the casing 2 is formed into a hollow cylinder by threadably connecting the closed-end cylindrical main body 2a, one end side of which (right end side in the figure) is provided with a female screw 24 and other end side is provided with a through-hole 25 in an opened manner on an axis center area, with the cylindrical valve seat clamp 2b, one end side of which is provided with a mail screw 26 screwed to the female screw 24 of the main body 2a, the main body 2a having a bottom wall. The hot-water inlet 20 and cold-water inlet 21 are provided on a cylinder wall of the main body 2a, and the hot-water valve seat a is provided on an inner end side of the hot-water inlet 20. The cold-water valve seat b, which is formed on an inner position of the cold-water inlet 21, is formed at an inner edge of the valves seat clamp 2b screwed to the main body 2a. The mixture ejection port 23 is formed on one end side of the valve seat clamp 2b, and an inner side of the valve seat clamp 2b is used as the mixing chamber 22.

The control valve mechanism w is formed in the form of a cylindrical valve and comprises: the control valve body 3 in which the hot-water valve 3a is formed on one edge of the cylinder wall of the control valve mechanism w and the cold-water valve 3b is formed on other edge; the bias spring 4 which is connected to the one edge side of the control valve body 3 and biases the control valve body 3 to the cold-water valve seat side b; and the temperature-sensitive coil spring 5 which is connected to one end side of the control valve body 3 and biases the control valve body 3 to the hot-water valve seat a side. The rear end side of the bias spring 4 which biases the control valve 3 toward the side of the hot water valve seat b is supported by the supporting member g formed separately from the adjusting screw 6a.

In this example the supporting member g is in the form of a rod, and one end side thereof (right end side in FIG. 3) is slidably inserted into the through-hole 63 provided in the axis center area of the adjusting screw 6a, and other end of same protruding from the through-hole 63 to the right is provided with the abutting section t1 constituted with a flange or retaining ring, whereby when the adjusting screw 6a moves to other end side thereof with respect to the supporting member g (right side in FIG. 3) to abut on the abutting section t1, the adjusting screw 6a is connected with the supporting member g integrally to, thereafter, move the supporting member g to the other end side. Moreover, the bias spring 4, which is formed into a coil, is inserted into the other end side by means of the abutting section t1, and the rear end side of a spring bearing 40 housing the bias spring 4 is caused to abut against an end surface of the abutting section t1 on the other end side, whereby the adjusting screw 6a supports the rear end side of the bias spring 4 by means of the supporting member g.

Accordingly, the control valve body 3 is supported by the balance between the two springs, i.e. the bias spring 4 and the temperature-sensitive coil spring 5. A leading end 4b of the bias spring 4 whose rear end side 4a is supported by the adjusting screw 6a through the supporting member g, is connected to a leading end 5b of the temperature-sensitive coil spring 5 whose rear end side 5a is supported by the valve seat clamp 2b, so that the control valve body 3 can move in the axial direction, and is caused to perform control operation by the temperature-sensing operation of the temperature-sensitive coil spring 5 positioned inside the mixing chamber 22.

y is the temperature-regulating means for regulating the control operation of the control valve body 3 so that the control operation is performed at a desired set temperature. The temperature-regulating means comprises: the adjusting screw axis 6b inserted rotatably into the through-hole 25 on one end side of the main body section 2a of the casing 2, and connected to the temperature-regulating dial D1 at an outer end side of the adjusting screw axis 6b; and the abovementioned adjusting screw 6a, an outer peripheral surface of which is fitted with an inner surface of the main body section 2a via a spline-like engaging section 60 following the axial direction, and an inner peripheral surface of which is formed on a female screw 62 screwed to a male screw 61 formed on an external surface on an inner end side of the adjusting screw axis 6b. The supporting member g is moved in the axial direction with the adjusting screw 6a by turning the temperature-regulating dial D1, whereby the balanced position between the bias spring 4 and the temperature-sensitive coil spring 5 is changed and the set temperature is set.

In the control valve body 3 of the control valve mechanism w, the through-hole 30, which passes through in the axial direction, is provided in an opened manner in the axis center area of the control valve body 3, and is inserted slidably into other end side of the supporting member g which is formed in the form of a rod. The through-hole 30 is caused to guide the movement of the control valve body 3 performing the control operation, and the other end side of the supporting member g is inserted into a guide cylinder 27 in the form of a cylinder, which is provided on the valve seat clamp 2b to support the other end side of the supporting member g, whereby the control valve body 3 is fixedly assembled to the casing 2. Accordingly, when the control valve body 3 performs the control operation, the movement of the control valve body 3 is restricted by the other end side of the supporting member g so that the control valve body 3 moves in the axial direction only, and, at the time of the control operation, the control valve body 3 is prevented from moving in an irregular direction which is tilted from the axial direction.

7 is a lifting spring which is incorporated so as to bias the control valve body 3 to the hot-water valve seat a side, only when the set temperature is set for cold-water ejection for the control valve mechanism w.

The lifting spring 7 is incorporated using the supporting member g which is formed in the shape of a rod as described above. The supporting member g is also used as an assembling frame for assembling the control valve mechanism w to the casing 2.

Figure 5:
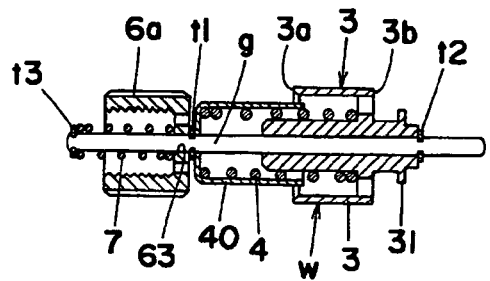
FIG. 5 is a cross-sectional view showing a state in which an adjusting screw and a lifting spring are assembled to the unit of the above-described embodiment.
Figure 6:
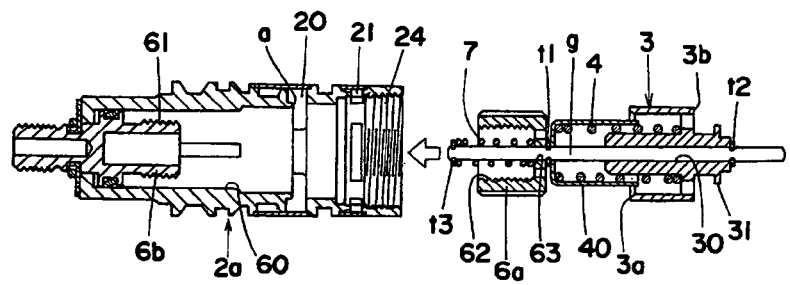
FIG. 6 is an explanatory diagram of a process of assembling the above-described unit to a main body section of a casing.

The control valve body 3, when assembled into the casing 2, is assembled into a unit which integrally combines the bias spring 4 and the supporting member g by, as shown in FIG. 5, fitting a retaining ring, which is the abutting section t1, into a section proximate to one end side of the supporting member g formed into a rod, inserting the spring bearing 40, which is formed in the shape of a sheath, from the other end side of the supporting member g into the retaining ring, then inserting the bias spring 4 formed into a coil, thereafter inserting the control valve body 3, and in this state fitting a retaining ring t2 to the one end side of the supporting member g to prevent the control valve body 3 from being detached. In this manner the control valve body 3 is assembled to the casing 2 by insertion. At this moment, on the other end side of the supporting member g, the above-described adjusting screw 6a, which is screwed to the adjusting screw axis 6b, is slidably inserted, via the through-hole 63 provided on the axis center area on the bottom wall of the adjusting screw 6a, into a protruding end section which protrudes from the abutting section t1 for regulating the spring bearing 40 moving to the other end side of the supporting member g. Further, the lifting spring 7, which is formed into a coil, is inserted, and other end side of the lifting spring 7 is regulated by a retaining ring t3 attached to the protruding end section on the other end side of the supporting member g to prevent the lifting spring 7 from being detached from the supporting member g. Accordingly, the control valve body 3 is integrally assembled to the above-described unit and inserted into the casing 2 to obtain the assembled state shown in FIG. 3.

In this state, the lifting spring 7 acts to press the adjusting screw 6a toward the other end side of the supporting member g. However, the adjusting screw 6a abuts on the abutting section t1 and then stops so that the supporting member g no longer moves toward the other end side thereof, thus the spring load of the lifting spring 7 does not acts on the bias spring 4 and the control valve body 3.

Figure 7:
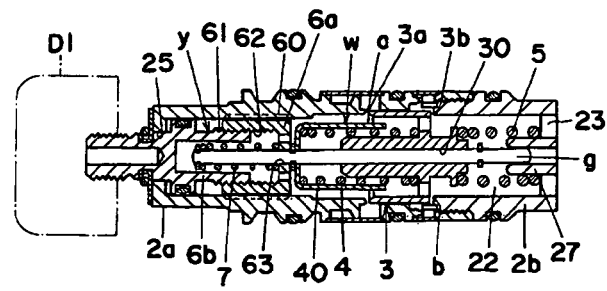
FIG. 7 is a cross-sectional view showing a state in which setting is performed so as to eject a mixture, according to the above-described embodiment.
Figure 8:
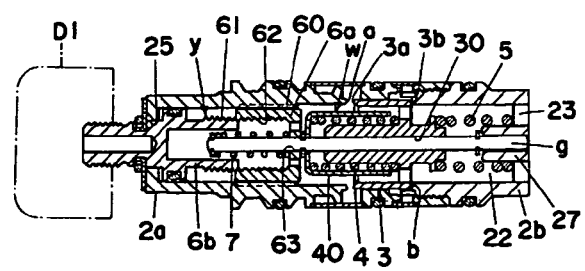
FIG. 8 is a cross-sectional view showing a state in which hot-water ejection is set, according to the above-described embodiment.
Figure 9:
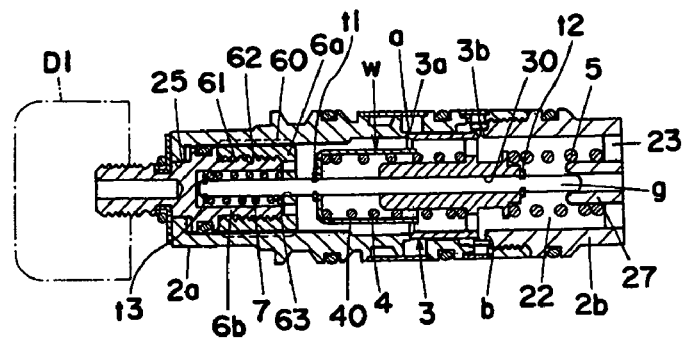
FIG. 9 is a cross-sectional view showing a state in which cold-water ejection is set, according to the above-described embodiment.

Specifically, when the lifting spring 7, which is assembled to the control valve mechanism w, performs setting so as to eject the mixture of the hot water and cold water in a normal temperature range, the supporting member g is held in the state shown in FIG. 7 so that it is not compressed, thus the lifting spring 7 does not act thereon. Moreover, when the cold-water valve seat b is closed completely and setting is performed so that hot water is ejected, the state shown in FIG. 8 is obtained in which the lifting spring 7 is not compressed and the load thereof is not generated. However, as shown in FIG. 9, when the hot-water valve seat a is closed completely and cold-water ejection is set, the adjusting screw 6a moves in a pull-back direction toward the supporting member g, whereby the lifting spring 7 is compressed and the load thereof is generated, and then the supporting member g adds the load to the load of the temperature-sensitive coil spring 5 which pushes the control valve body 3 toward the hot-water valve seat a side.

Embodiment 2

Figure 10:
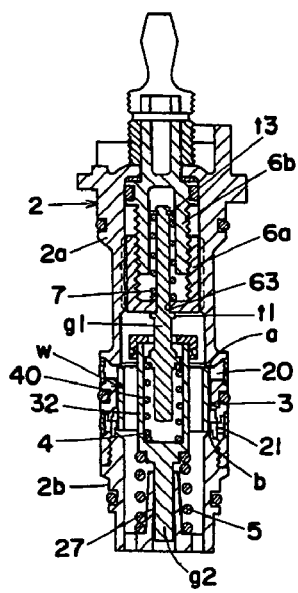
FIG. 10 is a longitudinal section view of other embodiment.

FIG. 10 shows other embodiment. In this embodiment, the casing 2 is formed into a cylinder so as to be fitted, in the form of a cartridge, into the external housing 1 which forms the case of the hot water-water mixing faucet A by means of the main body section 2a and the valve seat clamp 2b screwed thereto. The control valve mechanism w, which is incorporated in the casing 2, is configured in the same way as described in the abovementioned embodiment in which the control valve body 3 is supported by the balance between the two springs of the bias spring 4 and temperature-sensitive coil spring 5 so as to be able to move in the axial direction, and control operation is performed by the temperature-sensing operation of the temperature-sensitive coil spring 5 located in the mixing chamber 22 which is formed in the bore of the valve seat clamp 2b on one end side of the casing 2 by using the hot-water inlet 20 and cold-water inlet 21 which are formed on the cylinder wall of the main body section 2a, the hot-water valve seat a which is provided on the inner position of the hot-water inlet 20, the cold-water valve seat b which is disposed on the inner position of the cold-water inlet 21 and provided on the inner edge of the valve seat clamp 2b, the control valve body 3 in the form of a cylindrical valve, which is formed separately from the casing 2 and inserted into the casing 2 so as to be able to move in the axial direction, the bias spring 4 which is connected to one edge side (upper edge side in the figure) of the control valve body 3 and biases the control valve body 3 to the cold-water valve seat b side, and the temperature-sensitive coil spring 5 which is connected to other edge side of the control valve body 3 and biases the control valve body 3 to the hot-water valve seat side a.

Figure 11:
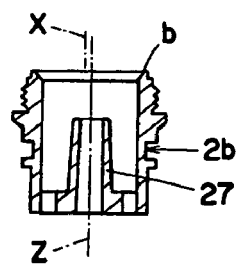
FIG. 11 is a longitudinal section view of a valve seat clamp according to the above-described embodiment.

In this embodiment, however, as shown in FIG. 11, the sheet surface of the cold-water valve seat b which is formed in the shape of a ring on the inner edge (upper edge in the figure) of the valve seat clamp 2b is formed in the shape of a belt which is wider than the cold-water valve 3b formed on a lower edge side of the cylinder wall of the control valve body 3 formed in the shape of a cylindrical valve. The wide sheet surface is formed into a funnel-shaped tapered surface in which the diameter narrows down gradually toward a lower part, and the virtual center line X on the ring-like cold-water valve seat b is decentered so as to be inclined slightly toward one side (left side in the figure) of the axis center line Z of the valve seat clamp 2b.

Moreover, in the control valve body 3, the cold-water valve 3b, which faces the cold-water valve seat b and is provided in the form of a ring on the lower edge of the cylinder wall of the control valve body 3, is formed such that the virtual axis center line is aligned with the axis center line of the control valve body 3, and such that the width of the control valve body 3 is narrower than the sheet surface of the cold-water valve seat b and is formed into a tapered surface, which is substantially parallel to the sheet surface. Further, a lower guide g2 is provided on a lower end side of the control valve body 3, and the lower guide g2 is inserted into the guide cylinder 27 provided in the bore of the valve seat clamp 2b, whereby the axis center line of the cold-water valve 3b matches with the axis center line of the valve seat clamp 2b so that the ring-like water valve 3b moves back and forth with respect to the cold-water valve seat b. Accordingly, the cold-water valve 3b abuts against the cold-water valve seat b in a state in which the virtual center line is decentered to one side (right side in the figure) as shown in FIG. 12.

Figure 12:
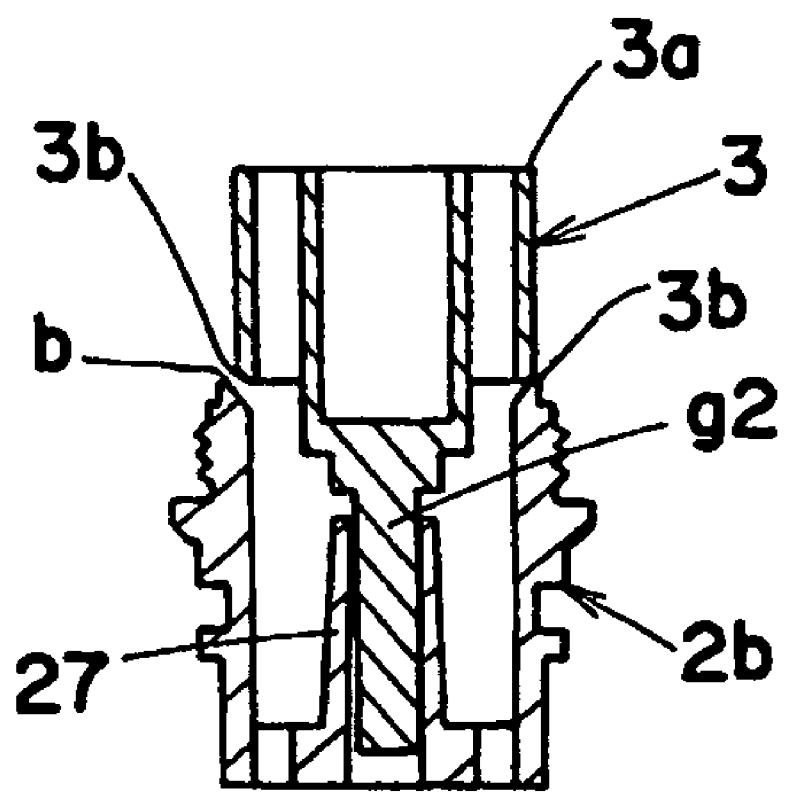
FIG. 12 is a longitudinal section view of the valve seat clamp of the above-described embodiment and a control valve body abutting thereon.

For this reason, when the control valve body 3 falls and the cold-water valve 3b abuts on the cold-water valve seat b to close the water path between the cold-water valve 3b and the cold-water valve seat b, the decentered side of the cold-water valve 3b (right side in FIG. 12) is partially sealed as shown in FIG. 12, but the other side opposite to the decentered side is not sealed but held in the opened state. However, subsequent falling of the control valve body 3 causes the cold-water valve 3b to slide the sheet surface of the cold-water valve seat b to move downward, whereby the other side opposite to the decentered side is sealed. Accordingly, when completely closing the water path between the cold-water valve 3b and the cold-water valve seat b, the space between the cold-water valve 3b and the cold-water valve seat b is not completely closed but is sealed partially and gradually, whereby the temperature changes not drastically but slowly, eliminating the hunting phenomenon.

In the case in which the means for decentering the ring-like valve (cold-water valve 3b) toward the axis center line of the control valve body 3 provides the side of the hot-water valve 3a with the line decentered to the axis center line and completely closes the hot-water path, the ring-like valve being formed on an edge on the cylinder wall of the control valve body 3, there is a way of avoiding a drastic blockage of the hot-water path or a way of blocking both the hot-water path and the cold-water path by providing the cold-water valve 3b and hot-water valve 3a with the decentered line.

Only based on the operation performed when the control valve body 3 closes the valves, the action/function for the elimination of the hunting phenomenon by using the means for decentering the ring-like valve (hot-water valve 3a/cold-water valve 3b) formed on the edge on the cylinder wall of the control valve 3 toward the ring-like valve seat (hot-water valve seat a/cold-water valve seat b) provided on the main body 2a/valve seat clamp 2b is explained. However, for the opening of the valves as well, the sealed ring-like valve and valve seat partially separate from each other gradually, thus the hunting phenomenon is eliminated at the time of opening the valves.

Further, in this embodiment, the supporting member g, which is provided so as to guide the operation of the control valve body 3 in the axial direction, is divided into to two: an upper guide g1 and the lower guide g2. One end side of the upper guide g1 (upper end side in FIG. 10) is inserted into the through-hole 63 until the abutting section t1 abuts on the upper guide g1, the through-hole 63 being provided on the adjusting screw 6a. Then the lifting spring 7 is assembled to the part where the upper guide g1 is inserted. Other end side, which extends downward from the abutting section t1, is inserted into a cylindrical closed-end spring case 32, which is in the form of a sheath and formed on the axis center area of the control valve body 3. The upper end side of the bias spring 4 which is housed in the spring case 32 is supported by a spring bearing seat 31 which is connected to the bias spring. The lower guide g2 is connected integrally to the lower end side of the control valve body 3 such that the lower guide g2 extends out therefrom, and this lower guide g2 is inserted into the guide cylinder 27 provided in the bore of the valve seat clamp 2b.

The guide cylinder 27 in to which the lower guide g2 is inserted is formed such that an inner diameter thereof is enlarged slightly toward one end side (outer end side). Accordingly, the control valve body 3 moves toward the valve seat clamp 2b as shown in FIG. 12, and when the cold-water valve 3b abuts on the cold-water valve seat b, the lower guide g2 can be rotated around a supporting point on the upper end side of the guide cylinder 27, in a tilted fashion, by the amount of the enlarged inner diameter of the guide cylinder 27. Consequently, the control valve body 3, which moves slidingly toward the side opposite to the decentered side, is guided smoothly by this tilted rotation.

The invention claimed is:

1. A hot and cold water mixing faucet comprising:
   a hot-water inlet and a cold-water inlet arranged in a cylindrical casing;
   a circular hot-water valve seat and cold-water valve seat provided face to face on inner positions of the hot-water inlet and the cold-water inlet respectively;
   a cylindrical control valve body, which forms a hot-water valve and a cold-water valve into a circle at both edges of the control valve body, is embedded in the cylindrical casing so as to be able to move in an axial direction;
   a leading end of a bias spring, whose rear end is supported by an adjusting screw, is connected to a leading end of a temperature-sensitive coil spring, whose rear end is supported by the casing such that the both leading ends face each other from both edges of the control valve body, so that the control valve body is held at a position at which the two springs of the bias spring and the temperature-sensitive coil spring are balanced;
   wherein the adjusting screw supporting the bias spring is screwed to an adjusting screw axis which is turned by a turning operation of a temperature-regulating dial assembled to one end of the casing; and
   the adjusting screw is moved in the axial direction by turning the adjusting screw axis so that the supporting position of the bias spring is changed for setup,
   wherein the rear end of the bias spring is supported by a supporting member formed separately from the adjusting screw, the supporting member is inserted into a through-hole provided on the adjusting screw so that the supporting member slidingly moves in the axial direction, and is connected with the adjusting screw separably by an abutting section provided in an area protruding from the through-hole toward the bias spring, and
   a lifting spring is disposed between the adjusting screw axis and the supporting member and is provided inside the adjustment screw, and the lifting spring, which biases the supporting member to pull the supporting member back toward the side opposite to the bias spring to the adjusting screw, is provided between an area protruding from the through-hole toward the side opposite to the bias spring and the adjusting screw, the lifting spring is incorporated so as not to cause the lifting spring to act when setting a range of normal temperature but to generate a load for biasing the control valve body toward a side of the hot-water valve seat only when setting for cold-water ejection is performed.

2. A hot and cold water mixing faucet comprising:
   a hot-water inlet and a cold-water inlet arranged in a cylindrical casing;
   a circular hot-water valve seat and cold-water valve seat provided face to face on inner positions of the hot-water inlet and the cold-water inlet respectively;
   a cylindrical control valve body, which forms a hot-water valve and a cold-water valve into a circle at both edges of the control valve body, is embedded in the cylindrical casing so as to be able to move in an axial direction;
   a leading end of a bias spring, whose rear end is supported by an adjusting screw, is connected to a leading end of a temperature-sensitive coil spring, whose rear end is supported by the casing such that the both leading ends face each other from both edges of the control valve body, so that the control valve body is held at a position at which the two springs of the bias spring and the temperature-sensitive coil spring are balanced;

wherein the adjusting screw supporting the bias spring is screwed to an adjusting screw axis which is turned by a turning operation of a temperature-regulating dial assembled to one end of the casing; and the adjusting screw is moved in the axial direction by turning the adjusting screw axis so that the supporting position of the bias spring is changed for setup, wherein the rear end of the bias spring is supported by a supporting member formed separately from the adjusting screw, the supporting member is inserted into a through-hole provided on the adjusting screw so that the supporting member slidingly moves in the axial direction, and is connected with the adjusting screw separably by an abutting section provided in an area protruding from the through-hole toward the bias spring, one end of the supporting member is inserted into a guide cylinder, and the cylindrical control valve body is structured and arranged to move in the axial direction based on movement of the one end of the supporting member in the guide cylinder, wherein the valve of at least one of the hot-water valve and the cold-water valve provided in a circular shape in the control valve body, and the valve seat of at least one of the hot-water valve seat and the cold-water valve seat provided in a circular shape in the casing are installed such that a center line of the valve of at least one of the hot-water valve and the cold-water valve is slightly decentered to one side of an axis center line of the valve seat of either the valve for mixing cold and hot water seat in facing the axis center line.

* * * * *